No. 783,945. PATENTED FEB. 28, 1905.
H. A. FULLER.
POTATO DIGGER.
APPLICATION FILED OCT. 5, 1901. RENEWED AUG. 15, 1904.

Witnesses
William F. Hall
Chas. L. Wallace

Inventor
Henry A. Fuller
by

No. 783,945.                                                                                    Patented February 28, 1905.

UNITED STATES PATENT OFFICE.

HENRY A. FULLER, OF BEARDSTOWN, ILLINOIS.

POTATO-DIGGER.

SPECIFICATION forming part of Letters Patent No. 783,945, dated February 28, 1905.

Application filed October 5, 1901. Renewed August 15, 1904. Serial No. 220,861.

*To all whom it may concern:*

Be it known that I, HENRY A. FULLER, a citizen of the United States, residing at Beardstown, in the county of Cass and State of Illinois, have invented certain new and useful Improvements in Potato-Diggers; and I do hereby declare the following to be a full, clear, and exact description of the invention, such as will enable others skilled in the art to which it appertains to make and use the same.

This invention relates to improvements in potato-diggers, and is more particularly designed as an improvement in diggers for sweet potatoes.

The object of the present invention is to provide a digger of the character stated which is extremely simple in construction, but one which is adapted to effectually operate upon the potatoes for loosening and elevating the same; and, furthermore, the invention aims to provide a digger embodying in its construction simple and efficient means for thoroughly protecting the bearings of the cutters from accumulations of sand and other foreign matter, so that the life of said bearings is greatly prolonged and the same always maintained in proper working condition.

With these general objects in view and others which will appear as the nature of the improvements is better understood the invention consists, substantially, in the novel construction, combination, and operation of parts, as will be hereinafter fully described, illustrated in the accompanying drawings, and pointed out in the appended claims.

Figure 1:
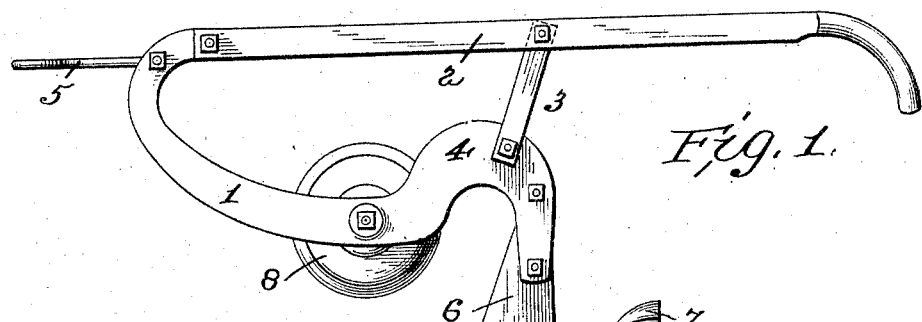
Figure 2:
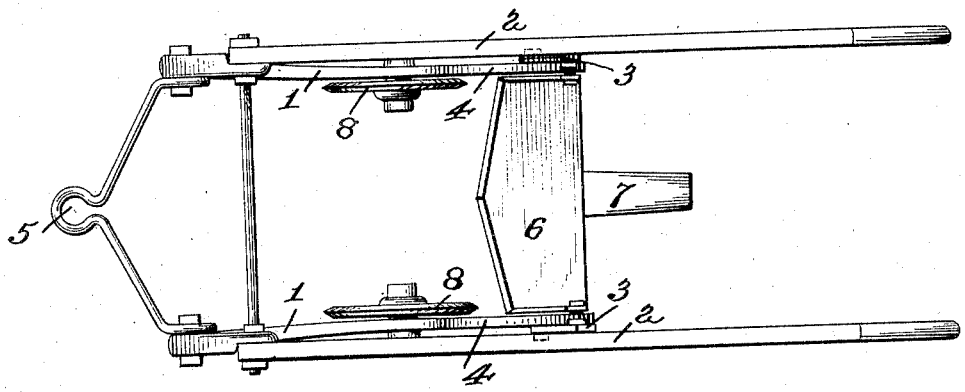
Figure 4:
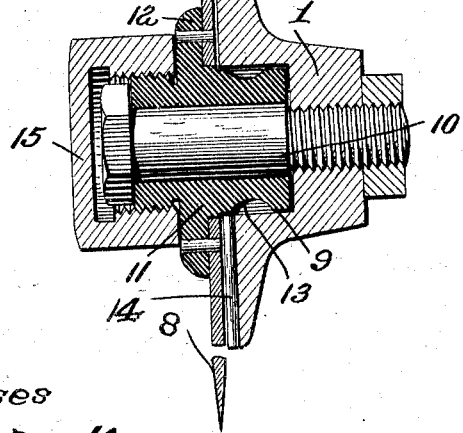
Figure 3:
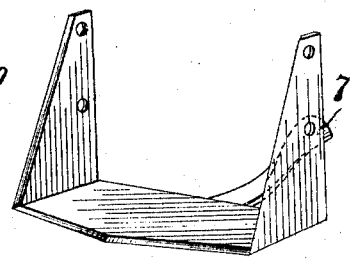

In the drawings, Figure 1 is a side elevation of a potato-digger constructed in accordance with the present invention. Fig. 2 is a top plan view thereof. Fig. 3 is a detail perspective view of the scoop. Fig. 4 is a transverse sectional view, on an enlarged scale, of one of the cutters and the bearing for the same.

Referring to the drawings, the numeral 1 designates a pair of forwardly and upwardly curved runners, which runners constitute the major portion of the digger-frame, and said runners are adapted to traverse the ground for engaging the potato-vines to hold the same close to the ground. Connected to each of the runners 1 at the forward end thereof is a horizontally-disposed rearwardly-extending handle-bar 2, and said handle-bars are also, through the medium of stays 3, connected for rigidity to inverted-U-shaped heads 4, arranged at the rear ends of the runners 1.

A draft-bar 5, arranged between the forward ends of the runners 1, is provided for the attachment of a team to effect draft of the digger.

Depending from the heads 4 and arranged in a plane below the runners 1 is a U-shaped scoop 6, the latter being preferably of sheet metal and extending across the entire width of the frame, and said scoop passes beneath the hills of potatoes and is designed for severing any downwardly-shooting roots from the potato-hills. The scoop 6 has at its rear edge a rearwardly-extending lifting-tongue 7, said tongue being bent upwardly and being adapted to engage the potatoes for loosening the same and raising them to effect their easy removal from the ground by hand.

Arranged upon each of the runners 1 approximately midway its length is a rotary cutting-disk 8, said disk being preferably of steel and having its periphery sharpened to provide a cutting edge, and said cutters are adapted to engage the vines and other growth held down by the runners 1 to sever the same.

It is, as before premised, one of the objects of the present invention to provide a bearing for each of the cutters 8 which will effectually exclude sand and other foreign matter therefrom, and thereby prevent accumulation of such matter therein. To this end each of the runners 1 has its inner face countersunk at the point of attachment of its cutter to provide a recess 9, and passing through said recess and into the runner is a bearing bolt or pin 10, which bolt or pin forms the journal upon which the cutter 8 rotates. Mounted upon the bolt 10 is a hub 11, which extends into and rotates within the recess 9, and said hub is provided at a point substantially midway its ends with an annular flange 12, to which latter the cutting-disk 8 is riveted or otherwise suitably fastened in order to rotate with the hub. The inner end of the hub is provided with an annular groove 13, said groove being designed to receive any sand which may enter the recess 9 between the runner 1 and the cutting-disk 8, and thereby prevent such sand passing to the bearing-bolt 10 to unduly wear the same. To facilitate the removal of the sand which may enter the groove 13, the inner side of each of the runners 1 immediately beneath the bearing-bolt 10 is provided with a discharge-groove 14, the upper ends of said grooves communicating with the grooves 13, and through the medium of the grooves 14 it is obvious that as the sand is worked to the under side of the hubs 11 the same will at once enter said grooves and be discharged therethrough. The outer ends of the hubs 11 are screw-threaded, and mounted upon each of said threaded ends is a cap 15, which caps fit over the heads of the bearing-bolts 10 and protect the same from accumulations of dirt and sand, thus excluding the latter from the bolts 10 at their outer ends. The caps 15 may also be filled with oil, inasmuch as they make tight joint with the threaded portions of the hub 11, and when so filled will effectually lubricate the bearing bolts or pins 10, the caps acting in the nature of self-oilers.

From the foregoing it will be seen that the herein-described invention provides a potato-digger of extremely simple construction, and one which is designed for effectually operating upon the potatoes for loosening and elevating the same. It will also be seen that the invention provides a bearing for the cutters of such construction as to prevent accumulations of dirt, sand, and other foreign matter upon the journals thereof, and at the same time a bearing which will effectually rid itself of any dirt and sand which may gain entrance between the cutter and frame, thus precluding entrance of the dirt and sand to the journal, and thereby prolonging the life of the same.

While the form of the invention herein shown and described is believed to be a preferable embodiment thereof, it will of course be understood that the invention is susceptible of various changes in the form, proportion, and minor details of construction, and the right is therefore reserved to modify or vary the invention as falls within the spirit and scope thereof.

Having thus fully described the invention, what is claimed as new, and desired to be secured by Letters Patent, is—

1. In a potato-digger, the combination with a pair of runners adapted to traverse the ground and each provided at its rear end with an inverted-U-shaped head, of a U-shaped scoop connected to said heads and projecting downwardly therefrom to a plane below said runners, whereby said scoop is adapted to travel beneath the ground for severing the downwardly-shooting roots of the potato-hills, a tongue carried by said scoop for loosening and elevating the potatoes, and cutters carried by said runners for severing the growth during the passage of the digger.

2. In a potato-digger, the combination with a pair of runners adapted to traverse the ground and each provided at its rear end with an inverted-U-shaped head, of a U-shaped scoop connected to said heads and projecting downwardly therefrom to a plane below said runners, whereby said scoop is adapted to travel beneath the ground for severing the downwardly-shooting roots of the potato-hills, a tongue carried by said scoop for loosening and elevating the potatoes, and rotary cutters carried by said runners for severing the growth during the passage of the digger.

3. In a potato-digger having means for loosening and elevating the potatoes, the combination with a pair of runners adapted to traverse the ground, of cutters carried by said runners, the latter being countersunk at their inner faces to provide recesses, bearing-pins arranged in said recesses, and hubs carried by said cutters and projecting into said recesses, each of said hubs being provided with a groove adapted to receive accumulations of sand to prevent the latter passing to the cutter-journals.

4. In a potato-digger having means for loosening and elevating the potatoes, the combination with a pair of runners adapted to traverse the ground, of cutters carried by said runners, the latter being countersunk at their inner faces to provide recesses, bearing-pins arranged in said recesses, hubs carried by said cutters and projecting into said recesses, each of said hubs being provided with a groove adapted to receive accumulations of sand to prevent the latter passing to the cutter-journals, said runners being also provided with discharge-grooves communicating with the grooves of the hub to receive the accumulations of sand in said grooves.

5. In a potato-digger having means for loosening and elevating the potatoes, the combination with a pair of runners adapted to traverse the ground, of cutters carried by said runners, the latter being countersunk at their inner faces to provide recesses, bearing-pins arranged in said recesses, hubs carried by said cutters and projecting into said recesses, each of said hubs being provided with a groove adapted to receive accumulations of sand to prevent the latter passing to the cutter-journals, and caps carried by said hubs at their outer ends for protecting the contiguous ends of the bearing-pins.

6. In a potato-digger having means for loosening and elevating the potatoes, the combination with a pair of runners adapted to traverse the ground, of cutters carried by said runners, the latter being countersunk at their inner faces to provide recesses, bearing-pins arranged in said recesses, hubs carried by said cutters and projecting into said recesses, each of said hubs being provided with a groove adapted to receive accumulations of sand to prevent the latter passing to the cutter-journals, said runners being also provided with discharge-grooves communicating with the grooves of the hub to receive the accumulations of sand in said grooves, and caps carried by said hubs at their outer ends for protecting the contiguous ends of the bearing-pins.

In testimony whereof I affix my signature in the presence of two witnesses.

HENRY A. FULLER.

Witnesses:
W. A. SCHROEDER,
C. C. WILSON.